United States Patent
Wilson et al.

(10) Patent No.: US 7,084,175 B2
(45) Date of Patent: Aug. 1, 2006

(54) ANIMAL FOOD AND METHOD

(75) Inventors: Mark E. Wilson, Madison, WI (US); Ronny L. Moser, Gridley, IL (US); Donald E. Orr, Jr., Noblesville, IN (US); David D. Hall, Noblesville, IN (US); Douglas M. Webel, Westfield, IN (US)

(73) Assignee: United Feeds, Sheridian, IN (US)

( * ) Notice: Subject to any disclaimer, the term of this patent is extended or adjusted under 35 U.S.C. 154(b) by 413 days.

(21) Appl. No.: 09/870,899

(22) Filed: May 31, 2001

(65) Prior Publication Data
US 2002/0051844 A1 May 2, 2002

Related U.S. Application Data

(60) Provisional application No. 60/208,616, filed on Jun. 1, 2000.

(51) Int. Cl.
A61K 31/20 (2006.01)

(52) U.S. Cl. ....................................................... 514/558
(58) Field of Classification Search ................. 514/558
See application file for complete search history.

(56) References Cited

U.S. PATENT DOCUMENTS

| 3,966,998 A | 6/1976 | Rawlings et al. |
| 4,752,618 A | 6/1988 | Mascioli et al. |
| 4,764,532 A | 8/1988 | Corman et al. |
| 4,792,546 A | 12/1988 | Baker |
| 4,868,001 A | 9/1989 | Maruta |
| 5,023,100 A | 6/1991 | Chang et al. |
| 5,110,592 A | 5/1992 | Stitt |
| 5,698,246 A | 12/1997 | Villamar |
| 5,869,530 A | 2/1999 | Ponroy |
| 5,985,348 A | 11/1999 | Barclay |
| 6,015,798 A | 1/2000 | Ogilvie et al. |
| 6,020,377 A | 2/2000 | O'Quinn et al. |
| 6,060,087 A | 5/2000 | Cook et al. |
| 6,656,494 B1 | 12/2003 | Nakata et al. |

FOREIGN PATENT DOCUMENTS

| EP | 1169924 | 1/2002 |
| WO | WO 98/00125 | 1/1998 |
| WO | WO 01/28354 | 4/2001 |

OTHER PUBLICATIONS

Freese, et al., "α-linolenic acid and marine long-chain n-3 fatty acids differ only slightly in their effects on hemostatic factors in healthy subjects", Am. J. Clin. Nutr., 66, pp. 591-598, (1997).

(Continued)

Primary Examiner—Sreeni Padmanabhan
Assistant Examiner—Shobha Kantamneni
(74) Attorney, Agent, or Firm—Barnes & Thornburg LLP

(57) ABSTRACT

The present invention is directed to compositions and methods for increasing the reproductive performance of breeding populations of swine. The swine feed compositions of the present invention are animal feed blends including marine animal products such as a fish oil or fish meal products. Methods include administering to the female swine a biologically effective amount of the swine feed composition comprising marine animal products wherein the marine animal products contain omega-3 fatty acids or esters thereof that serve as a source of metabolites in the female swine, to improve reproductive performance of the female swine.

51 Claims, 2 Drawing Sheets

Frequency distribution of litter size

OTHER PUBLICATIONS

Goodwin, John-Karl, "The Nondrug Therapy of Heart Disease in the Dog and Cat", *Emerging Science & Technology*, pp. 24-29, (1996).

Goodwin, et al., "The role of dietary modification and nondrug therapy in dogs and cats with congestive heart failure", *Veterinary Medicine*, pp. 919-926, (1998).

Goodwin, et al., "Role of Lipoxygenase Metabolites of Arachidonic Acid in T Cell Activation", *Annals New York Academy of Sciences*, 524:201-207, (1988).

Grauer, et al., "Effects of dietary n-3 fatty acid supplementation versus thromboxane synthetase inhibition on gentamicin-induced nephrotoxicosis in healthy male dogs", *AJVR*, vol. 57, No. 6, pp. 948-956, (1996).

Grimsgaard, et al., "Highly purified eicosapentaenoic acid and docosahexaenoic acid in humans have similar triacylglycerol-lowering effects but divergent effects on serum fatty acids", *Am. J. Clin. Nutr.*, 66, pp. 649-659, (1997).

Guilford, W.G., "New ideas for the dietary management of gastrointestinal tract disease", *Journal of Small Animal Practice*, 35, pp. 620-624, (1994).

Hall, Jean A., "Potential Adverse Effects of Long-Term Consumption of (n-3) Fatty Acids", *The Compendium*, vol. 18, No. 8, pp. 879-895, (1996).

Hall, et al., "Effect of dietary n-6 to n-3 fatty acid ratio on complete blood and total white blood cell counts, and T-cell subpopulations in aged dogs", *AJVR*, vol. 60, No. 3, pp. 319-327, (1999).

Hansen, et al., "Duration of effects of dietary fish oil supplementation on serum eicosapentaenoic acid and docosahexaenoic acid concentrations in dogs", *AJVR*, vol. 59, No. 7, pp. 864-868, (1998).

Luo, et al., "Dietary (n-3) Polyunsaturated Fatty Acids Improve Adipocyte Insulin Action and Glucose Metabolism in Insulin-Resistant Rats: Relation to Membrane Fatty Acids", *J. Nutr.*, 126:, pp. 1951-1958, (1996).

MacDonald, et al., "Role of Linoleate as an Essential Fatty Acid for the Cat Independent of Arachidonate Synthesis", *J. Nutr.*, 113: 1422-1433, (1983).

MacDonald, et al., "Effects of Linoleate and Arachidonate Deficiencies on Reproduction and Spermatogenesis in the Cat", *J. Nutr.*, 114: 719-726; (1984).

Nair, et al., "Prevention of Cardiac Arrhythmia by Dietary (n-3) Polyunsaturated Fatty Acids and Their Mechanism of Action", *J. Nutr.*, 127:383-393, (1997).

Neuninger, M., "Cerebral Cortex Docosahexaenoic Acid is Lower in Formula-Fed Than in Breast-Fed Infants", *Nutrition Reviews*, vol. 51, No. 8, pp. 238-241, (1993).

Odle, et al., "Utilization of Medium-Chain Triglycerides by Neonatal Piglets: Chain Length of Even-and Odd-Carbon Fatty Acids and Apparent Digestion/Absorption of Hepatic Metabolism", *J. Nutr..*, 121: 605-614, (1991).

O'Quinn, et al., "A comparison of modified tall oil and conjugated linoleic acid on growing-finishing pig growth performance and carcass characteristics", *JAS-Midwestern Section ADSA, ASAS*, p. 61, (1998).

O'Shea, et al., "Conjugated linoleic acid in bovine milk fat: a food-based approach to cancer chemoprevention", *Trends in Food Science & Technology.*, 9:192-196, (1998).

Pawlosky, et al., "Retinal and brain accretion of long-chain polyunsaturated fatty acids in developing felines: the effects of corn oil-based maternal diets", *J. Clini. Nutr.*, 65:465-472, (1997).

Reeves, et al., "AIN-93 Purified Diets for Laboratory Rodents: Final Report of the J. Nutr. Ad Hoc Writing Committee on the Reformulation of the AIN-76A Rodent Diet", *J. Nutr.*, 123: 1939-1951, (1993).

Horrobin, David F., "Fatty acid metabolism in health and disease: the role of Δ-6-desaturase", *Am. J. Clin. Nutr.*, 57(suppl), pp. 732S-737S, (1993).

Hulan, et al., "Omega-3 Fatty Acid Levels and Performance of Broiler Chickens Fed Refish Meal or Redfish Oil", *Cm J. Anim. Sci.*, 68, pp. 533-547, (1988).

Innis, Sheila M., "The colostrum-Deprived Piglet as a Model for Study of Infant Lipid Nutrition", *J. Nutr.*, 123: 386-390, (1993).

ISSFAL, "International Society for the Study of Fatty Acids and Lipids Board Statement: Recommendations for the Essential Fatty Acid Requirement for Infant Formulas", *Nutrition Today*, vol. 30, No. 1, pp. 46, (1995).

Jensen, et al., "Lymphatic absorption of enterally fed structured triacylglycerol vs. physical mix in a canine model", *Am. J. Clin. Nutr.* 60, pp. 518-524, (1994).

Katan, M.B., "Fish and Heart Disease: What is the Real Story?", *Nutrition Reviews*, vol. 53, No. 8, pp. 228-230, (1995).

Kim et al., "Nutrition Chemoprevention of Gastrointestinal Cancers: A Critical Review", *Nutrition Reviews*, vol. 54, No. 9, pp. 259-279, (1996).

Kinsella, John E., "Food Lipids and Fatty Acids: Importance in food Quality, Nutrition, and Health", *Food Technology*, pp. 124-145, (1988).

Korver, et al., "Dietary Fish Oil or Lofrin, A 5-Lipoxygenase Inhibitor, Decrease the Growth-Suppressing Effects of Coccidiosis in Broiler Chicks", *Poultry Science*, 76, 1355-1363, (1997).

Kretchmer, et al., "The role of nutrition in the development of normal cognition", *Am. J. Clin. Nutr.*, 63, pp. 997S-1001S, (1996).

Sanders, et al., "A comparison of the influence of breast-feeding and bottle-feeding on the fatty acid composition of the erythrocytes", *Br. J. Nutrition*, 41, pp. 619-623, (1979).

Simpoulos, Artemis P., "Omega-3 fatty acids in health and disease and in growth and development", *Am. J. Clin. Nutr.*, 54, pp. 438-463, (1991).

Turek, et al., "Dietary Polyunsaturated Fatty Acids Modulate Responses of Pigs to *Mycoplasma hyopneumoniae* Infection", *J. Nutr.*, 126: 1541-1548, (1996).

Wallingford, et al., "Development of the Health Claims Regulations: The Case of Omega-3 Fatty Acids and Heart Disease", *Nutrition Reviews*, vol. 49, No. 11, pp. 323-331, (1991).

Wanasundara, et al., "Positional Distribution of Fatty Acids In Triacylglycerols of Seal Blubber Oil", *Journal of Food Lipids*, 4, pp. 51-64, (1997).

Wander, et al., "The Ratio of Dietary (n-6) to (n-3) Fatty Acids Influences Immune System Function, Eicosanoid Metabolism, Lipid Peroxidation and Vitamin E Status in Aged Dogs", *J. Nutr.*, 127:.1198-1205, (1997).

Watts, et al., "Dietary fatty acids and progression of coronary artery disease in men", *Am. J. Clin. Nutr.*, 64: 202-209, (1996).

Whelan, Jay, "Antagonistic Effects of Dietary Arachidonic Acid and n-3 Polyunsaturated Fatty Acids", *J. Nutr.*, 126: 1086S-1091S, (1996).

Whelan, Jay, "Polyunsaturated Fatty Acids: Signaling Agents for Intestinal Cancer?", *Nutrition Today*, vol. 32, No. 5, pp. 213-218, (1997).

Wu, et al., "Immunologic effects of marine- and plant-derived n-3 polyunsaturated fatty acids in nonhuman primates", *Am. J. Clin. Nutr.*, 63: 273-280, (1996).

Yeh, et al., "Enrichment of (n-3) Fatty Acids of Suckling Rats by Maternal Dietary Menhaden Oil", *J. Nutr.*, 120: 436-443, (1990).

Yonekubo, et al., "Dietary Fish Oil Alters Rat Milk Composition and Liver and Brain Fatty Acid Composition of Fetal and Neonatal Rats", *J. Nutr.*, 123: 1703-1708, (1993).

Zemel, Michael B., "Insulin Resistance, Obesity and Hypertension: Insulin Overview", *J. Nutr.*, 125: 1715S-1717S, (1995).

Blebois, et al., "Effect of Dietary Fat on the Fatty Acid Composition and Fertilizing Ability of Fowl Semen", *Biology of Reproduction*, 556, pp. 1216-1220, (1997).

Trujillo, et al., "Ingestion of n-3 polyunsaturated fatty acids and ovulation in rats", *Journal of Reproduction and Fertility*, 105, pp. 197-203, (1995).

Ringo, et al., "The effect of dietary fatty acids on lactic acid bacteria associated with the epithelial mucosa and from faecalia of Arctic charr, Salvelinus alpinus (L)", *Journal of Applied Microbiology*, 85, pp. 855-864, (1998).

Schingoethe, et al., "Lactationalo Responses of Dairy Cows Fed Unsaturated Fat from Extruded Soybeans or Sunflower Seeds", *J. Dairy Sci.* 79, pp. 1244-1249, (1996).

Ackerman, Lowell, "Determatologic uses of fatty acids in dogs and cats", *Veterinary Medicine*, pp. 1149-1155, (1995).

Aydin, et al., "Dietary Conjugated Linoleic Acid Inhibits The Hatchability of Pigeon Eggs", *SPSS Abstracts*, S81, pp. 115 (1999).

Aydin, et al., "Olive Oil Alleviated the Adverse Effects of Dietary Conjugated Lioleic Acid on Hatchability", *SPSS Abstracts*, S82, pp. 115 (1999).

Aydin, et al., "Addition of Olive Oil Prevents Pink Discoloration of Egg white by Dietary Conjugated Linoleic Acid", *SPSS Abstracts*. S83, p. 115 (1999).

Banni, et al., "Conjugated Linoleic Acid and Oxidative Stress", *JAOCS*, vol. 75, No. 2, pp. 261-267, (1998).

Bauer, John E., "Management of Spontaneous Canine Renal Disease By Dietary Polyunsaturated Fatty Acids", *Proc. 13th ACVIM Forum*, pp. 477-479, (1995).

Bauer, John E., "New Concepts of Polyunsaturated Fatty Acids in Dog and Cat Diets", *Veterinary Clinical Nutrition*, vol. 4, No. 1, pp. 29-33, (1997).

Bauer, et al., "Effect of Diet and Fatty Acid Supplementation on Lipids and Lipoproteins in Canine Renal Disease", *Proc. 12th ACVIM Forum*,52, pp. 986, (1994).

Berry, Elliot M., "Dietary fatty acids in the management of diabetes mellitus", *Am. J. Clin. Nutr.*, 66 (suppl), pp. 991S-997S, (1997).

Billman, et al., "Prevention of Ischemia-Induced Cardiac Sudden Death by n-3 Polyunsaturated Fatty Acids in Dogs", *Lipids*, vol. 32, No. 11, pp. 1161-1168, (1997).

Boothe, Dawn M., "Medical Management of Osteoarthrits", *Proc. 14th ACVIM Forum*, pp. 274-277, (1996).

Boudreaux, et al., "The Effects of Varying Dietary n-6 to n-3 Fatty Acid Ratios on Platelet Reactivity, Coagulation Screening Assays, and Antithrombin III Activity in Dogs", *Journal of the American Animal Hospital Association*, 33, pp. 235-243, (1997).

Bourre, et al., "Alterations in the Fatty Acid Composition of Rat Brain Cells (Neurons, Astrocytes, and Oligodendrocytes) and of Subcellular Fractions (Myelin and Synaptosomes) Induced by a Diet Devoid of n-3 Fatty Acids", *Journal of Neurochemistry*, 43, pp. 342-348, (1984).

Brown, Scott A., "Dietary Fatty Acid Supplementation and Chronic Renal Disease", *Proc. 13th ACVIM Forum*, pp. 470-472, (1995).

Brown, et al., "Dietary Fatty Acid Composition Affects Renal Function in Cats", *Proc. 16th ACVIM Forum*, 104, pp. 713, (1998).

Campbell, Karen L., "Fatty Acid Supplementation and Skin Disease", *Adv. in Clinical Dermatol.*, vol. 20, No. 6, pp. 1475-1486, (1990).

Campbell, et al., "Effects of Four Diets on Serum and Cutaneous Fatty Acids, Transepidermal Water Losses, Skin Surface Lipids, Hydration and Condition of the Skin and Haircoat of Dogs", *11th Proceedings of AAVD/ACVD meeting*, pp. 80-81, (1995).

Chin, et al., "Dietary Sources of Conjugated Dienoic Isomers of Linoleic Acids, a Newly Recognized Class of Anticarcinogens", *Journal of Food Composition and Analysis*, 5, pp. 185-197, (1992).

Connor, et al., "Are fish oils beneficial in the prevention and treatment of coronary artery disease?", *Am. J. Clin. Nutr.*, 66(suppl), pp. 1020S-1031S, (1997).

Connor, et al., "Essential Fatty Acids: The Importance of n-3 Fatty Acids in the Retina and Brain", *Nutrition Reviews*, vol. 50, No. 4, pp. 21-29, (1992).

Down, et al., "Dyslipoproteinemia of Chronic Renal Failure: Its Relevance to Canine Progressive Kidney Disease", *Compendium*, 18, pp. 65-74, (1996).

Dugan, et al., "The effect of conjugated linoleic acid on fat to lean repartitioning and feed conversion in pigs", *Canadian Journal of Animal Science*, 77, pp. 723-725, (1997).

Emken, et al., "Effect of Dietary Arachidonic Acid on Metabolism of Deuterated Linoleic Acid by Adult Male Subjects", *Lipids*, vol. 33, No. 5, pp. 471-480, (1998).

Drevon, Christian A., "Marine Oils and Their Effects", *Nutrition Reviews*, vol. 50, No. 4, pp. 38-45, (1992).

Endres, Stefan, "Messengers and mediators: interactions among lipids, eicosanoids, and cytokines", *Am.J. Clin. Nutr.*, 57(suppl), 798S-800S, (1993).

Farrell, David J., "Enrichment of hen eggs with n-3 long-chain fatty acids and evaluation of enriched eggs in humans", *Am. J. Clin. Nutr.*, 68, pp. 538-544, (1998).

Fernandez et al., "Fish consumption and cancer risk", *American Journal of Clinical Nutrition*, vol. 70, No. 1, pp. 85-90, (Jul. 1999).

Frankel, et al., "The nutritional and metabolic impact of γ-linolenic acid (18:3ω6) on cats deprived of animal lipid", *Br. J. Nutr.*, 39, pp. 227-231, (1978).

Garg, Abhimanyu, "High-monounsaturated-fat diets for patients with diabetes mellitus: a meta-analysis", *Am J. Clin Nutr, 67 (suppl)*, pp. 577S-582S, (1998).

Gerbi, et al., "Fish Oil Supplementation Prevents Diabetes-Induced Nerve Conduction Velocity and Neuroanatomical Changes in Rats", *J. Nutr.*, pp. 207-213, (1998).

German et al., "Symposium: Biological Effects of Dietary Arachidonic Acid", *J. Nutr.*, pp. 1076S-1080S, (1996).

Herbel, et al., "Safflower oil consumption does not increase plasma conjugated linoleic acid coincentrations in humans", *Am. J. Clin. Nutr.*, 67, pp. 332-337, (1998).

Hoffman, et al., "Effects of supplementation with ω3 long-chain polyunsaturated fatty acids on retinal and cortical development in premature infants", *Am. J. Clin. Nutr.*, 57 (suppl), pp. 807S-812S, (1993).

Morrison, F.B., "Feeds and Feeding, A Handbook for the Student and Stockman", *The Morrison Publishing Company*, pp. 602-604, (1954).

Ensminger, M.E., "The Stockman's Handbook", *The Interstate*, pp. 401-406, (1978).

Fritsche, et al., "Enrichment of Omega-3 Fatty Acids in Suckling Pigs by Maternal Dietary Fish Oil Supplementation", *J. Anim. Sci.*, 71: 1841-1847, (1993).

Allen, et al., "Association of Lowered Plasma Carotenoids with Protection Against Cecal Coccidiosis by Diets High in n-3 Fatty Acids", *Poultry Science*, 75: 966-972, (1996).

Arbuckle, et al., "Docosahexaenoic Acid Is Transferred through Maternal Diet to Milk and to Tissues of Natural Milk-Fed Piglets", *J. Nutr.*, pp. 1668-1675, (1993).

Behme, Margaret, "Dietary Fish Oil Enhances Insulin Sensitivity in Minature Pigs", *J. Nutr.*, pp. 1549-1553, (1996).

Belury, "Conjugated Dienoic Linoleate: A Polyunsaturated Fatty Acid with Unique Chemoprotective Properties", *Nurtrition Reviews*, vol. 53, No. 4, pp. 83-89, (1995).

Bourre, et al., "The Effects of Dietary α-Linolenic Acid on the Composition of Nerve Membranes, Enzymatic Activity, Amplitude of Electrophysiological Parameters, Resistance to Poisons and Performance of Learning Tasks in Rats", *J. Nutr.*, pp. 1880-1892, (1989).

Bourre, et al., "Dietary α-Linolenic Acid at 1.3 g/kg Maintains Maximal Docosahexaenoic Acid Concentration in Brain, Heart and Liver of Adult Rats", *J. Nutr.*, pp. 1313-1319, (1993).

Broughton et al., "Frequency of (n-3) Polyunsaturated Fatty Acid Consumption Induces Alterations in Tissue Lipid Composition and Eicosanoid Synthesis in CD-1 Mice", *J. Nutr.*, pp. 1104-1111, (1994).

Broughton, et al., "Reduced asthma symptoms with n-3 fatty acid ingestion are related to 5-series leukotriene production", *Am. J. Clin. Nutr.*, pp. 1011-1017, (1997).

Carlson, Susan E., "Arachidonic Acid Status of Human Infants: Influence of Gestational Age at Birth and Diets with Very Long Chain n-3 and n-6 Fatty Acids", *J. Nutr.*, pp. 1092S-1098S, (1996).

Carlson, et al., "Docosahexaenoic acid status of preterm infants at birth and following feeding with human milk or formula", *Am. J. Clin. Nutr.*, 44, pp. 798-804, (1986).

Chalon et al., "Dietary Fish Oil Affects Monoaminergic Neurogransmission and Behavior in Rats", J. Nutr., pp. 2512-2519, (1998).

Clandinin, et al., "Docosahexaenoic Acid Increases Thyroid-stimulating Hormone Concentration in Male and Adrenal Corticotrophic Hormone Concentration in Female Weanling Rats", *J. Nutr.* 128, pp. 1257-1261, (1998).

Conquer, et al., "Supplementation with an Algae Source of Docosahexaenoic Adic Increases (n-3) Fatty Acid Status and Alters Selected Risk Factors for Heart Disease in Vegetarian Subjects", *J. Nutr.*, pp. 3032-3039, (1996).

Cook, et al., "Immune Modulation by Altered Nutrient Metabolism: Nutritional Control of Immune-Induced Growth Depression", *Poultry Science*, 72, pp. 1301-1305, (1993).

Crawford, Michael A., "The Role of Dietary Fatty Acids in Biology: Their Place in the Evolution of the Human Brain", *Nutrition Reviews*, vol. 50, No. 4, pp. 3-11, (1992).

Crawford, Michael A., "The role of essential fatty acids in neural development: implications for perinatal nutrition", *J. Clin. Nutr.*, 57(suppl.), pp. 703S-710S, (1993).

Crozier, Gayle L., "Medium-Chain Triglyceride Feeding over the Long Term: The Metabolic Fate of [$^{14}$C]ctanoate and [$^{14}$C]Oleat in Isolated Rat Hepatocytes", *J. Nutr.*, pp. 297-304, (1988).

Harris, et al., "Influence of n-3 fatty acid supplementation on the endogenous activities of plasma lipases", *Am. J. Clin. Nutr.*, 66, pp. 254-260, (1997).

Hashim, et al., "Medium Chain Triglyceride in Early Life: Effects on Growth of Adipose Tissue", *LIPIDS*, vol. 22, No. 6, pp. 429-434, (1987).

Holub, Bruce J., "The Role of Omega-3 Fatty Acids in Health and Disease", *Proc. 13$^{th}$ ACVIM Forum*, pp. 452-455, (1995).

Hwang, et al., "Does vegetable oil attenuate the beneficial effects of fish oil in reducing risk factors for cardiovascular disease?", *Am. J. Clin. Nutr.*, 66, pp. 89-96, (1997).

Ikeda, et al., "Effects of Long-Term Feeding of Marine Oils with Different Positional Distribution of Eicosapentaenoic and Docosahexaenoic Acids on Lipid Metabolism, Eicosanoid Production, and Platelet Aggregation in Hypercholesterolemic Rats", *Lipids*, vol. 33, No. 9, pp. 897-904, (1998).

Ip, "Review of the effects of *trans* fatty acids, oleic acid, n-3 polyunsaaturated fatty acids, and conjugatted linoleic acid on mammary carcinogenesis in animals", *Am. J. Clin. Nutr.*, 66 (suppl), pp. 1523S-1529S, (1997).

Jenski, et al., "The Triggering Signal Dictates the Effect of Docosahexaenoic Acid on Lymphocyte Function *in vitro*", *Lipids*, vol. 33, No. 9, pp. 869-878, (1998).

Johnston, John M., "Gastrointestinal Tissue", In: Lipid Metabolism of Mammals, vol. 1, Plenum, pp. 151-187, (1977).

Kay, Marguerite M.B., "An Overview of Immune Aging", *Mechanisms of Aging and Development*, 9, pp. 39-59, (1979).

Leaf, et al., "Cardiovascular Effects on n-3 Fatty Acids", *The New England Journal of Medicine*, vol. 318, No. 9, pp. 549-557, (1988).

MacDonald, et al., "Essential fatty acid requirements of cats: Pathology of essential fatty acid deficiency", *Am. J. Vet. Res.* vol. 45, No. 7, pp. 1310-1317, (1984).

Meyer, H., "Nutrient Digestibility and Its Relationship to Alimentary Disorders in Dogs", *Pergamon Press*, pp. 55-69, (1984).

Miller, et al., "Feeding Conjugated Linoleic Acid to Animals Partially Overcomes Catabolic Reponses Due to Endotoxin Injection", *Biochemical and Biophysical Research Communications*, 198, pp. 1107-1112, (1994).

Miller, et al., "Influence of Feeding Conjugated Linoleic Acid on Body Composition in Healthy Adult Cats", *Proc. 17$^{th}$ ACVIM*, 150, pp. 729, (1999).

Miller et al., "Treatment of Dogs With Hip Arthritis With A Fatty Acid Supplement", *Canine Practice*, vol. 17, No. 6, pp. 6-8, (1992).

Mooney, et al., "Evaluation of the effects of omega-3 fatty acid-containing diets on the inflammatory stage of wound healing in dogs", *AJVR*, vol. 59, No. 7, pp. 859-863, (1998).

Moore, et al., "Effect of Dietary Alpha-Linolenic Acid on Responses of Horses to Endotoxin", *Veterinary Clinical Nutrition*, vol. 3, No. 1, pp. 16-18, (1996).

Newton, Ian S., "Long Chain Fatty Acids In Health and Nutrition", *Journal of Food Lipids*, 3, pp. 233-249, (1996).

Ogilvie, Gregory, "Nutritional Anticancer Therapy: Frontiers for Cure!", *62$^{nd}$ Annual AAHA 'Meeting Proc.*, pp. 66-69, (1995).

Ogillvie, Gregory, "Recent Discoveries: Nutrition and Cancer—Are Eicosanoids the Answer?", *Veterinary Clinical Nutrition*, vol. 3, No. 3, pp. 78-82, (1996).

Ogilvie, et al., "Nutrition and Cancer", *Veterinary Clinics of North America: Small Animal Practice*, vol. 20, No. 4, pp. 969-985, (1990).

Peterson, et al., "Eicosapentaenoic and Docosahexaenoic Acids Alter Rat Spleen Leukocyte Fatty Acid Composition and Prostaglandin E2 Production But Have Different Effects oin Lymphocyte Functions and Cell-Mediated Immunity", *Lipids*, vol. 33, No. 2, pp. 171-180, (1998).

Peitinen, et al., "The Role of Nutrition in the Prevention and Treatment of Hypertension", *Advances in Nutritional Research*, vol. 8, pp. 35-73, (1990).

Plotaick, A. N., "The role of omega-3 fatty acids in renal disorders", *JAVMA*, vol. 209, No. 5, pp. 906-910, (1996).

Raz, et al., "Dietary Fish Oil Inhibits Δ6-Desaturase activity in vivo", *JAOCS*, vol. 75, No. 2, pp. 241-245, (1998).

Reinhart, Gregory A., "Review of Omega-3 Fatty Acids and Dietary Influences on Tissue Concentrations", *Proc. Iams International Symposium*, pp. 235-242, (1996).

Ross, Linda A., "Controversies in the Mangement of Chronic Renal Failure", *Proc. 14th ACVIM Forum*, pp. 298-299, (1996).

Rush, John E., "Alternative Therapies For Heart Failure Patients", *Proc. 14th Forum*, pp. 151-153, (1996).

Sebadio, et al., "Metabolites of conjugated isomers of linoleic acid (CLA) in the rat", *Biochimica et Biophysica Acta*, 1345, pp. 5-10, (1997).

Johanson, et al., "Within 13 days lipid source alters bone accretion and minneral balance in neonatal pigs", *J. Anim. Sci.*, vol. 76, Suppl. 1, 683, pp. 176, (1998).

Sinclair, A. J., "Metabolism of Linoleic Acid in the Cat", *Lipids*, 14, pp. 932-936, (1979).

Thiel, et al., "Conjugated linoleic acid improves performance and body composition in swine", *ASAS Midwest Meeting Abstracts*, 127, pp. 61, (1998).

Van den Berg, et al., "Reinvestigatioon of the Antioxidant Properties of Conjugated Linoleic Acid", *Lipids*, vol. 30, No. 7, pp. 599-605, (1995).

Vaughn, et al., "Evaluation of Dietary N-6 to N-3 Fatty Acid Ratios on Leukotriene B Synthesis in Dog Skin and Neutrophils", *J. Vet. Int. Med.*, 49, pp. 155, (1994).

Waldron, et al., "Role of long-chain polyunsaturated n-3 fatty acids in the development of the nervous system of dogs and cats", *JAVMA*, vol. 213, No. 5, pp. 619-622, (1998).

Waldron, et al, "Canine Neutrophil Phagocytosis is Correlated with membrane Fluidity", *Proc. 17th ACVIM*, 144, pp. 728, (1999).

Waldron, et al., "18 and 20 Carbon N-3 Fatty Acids Differentially Affect Canine Neurtophil Function At the Same N-6/N-3 Ratio", *Proc. 17th ACVIM*, 145, pp. 728, (1999).

White, P. D., "Essential Fatty Acids: Use in Management of Canine Atopy", *Compendium*, pp. 451-457, (1993).

Zhang, et al., "Oxidative Stability of Conjugated Linoleic Acids Relative to Other Polyunsaturated Fatty Acids", *JAOCS*, vol. 74, No. 12, pp. 1611-1613, (1997).

Badart-Smook, et al., "Fetal growth is associated positively with maternal intake of riboflavin and negatively with maternal intake of linoleic acid", *J. Am. Diet. Assoc.*, 97, pp. 867-870, (1997).

Bauer, et al., "Dietary n-6 fatty acid supplementation improves ultrafiltration in spontaneous canine chronic renal failure", *ACVIM abstracts*, p. 126, (1994).

Bauer, et al., "Dietary flaxseed in dogs results in differential plasma transport and metabolism of n-3 polyunsaturated fatty acid species", *Proc. Waltham Symposium*, p. 34, (1997).

Campbell, K. L., "Fatty acids in dermatology: Choices in treatment", *Proc. Central Veterinary Conference*, pp. 386-389, (1999).

Doyle, E., "Scientific forum explores CLA knowledge", *Inform*, 9: 69-73, (1998).

Dunshea, et al., "Dietary conjugated linoleic acid decreases back fat in finisher gilts", *J. Anim. Sci.*, 76. (Suppl. 1):131: 723-735, (1998).

Fernandes, G., "Dietary lipids and risk of autoimmune disease", *Clin. Immunol. Immunopathol.*, 72: 193-197, (1994).

Olsen, et al., "Intake of Marine Fat, Rich in (n-3) Polyunsaturated Fatty Acids, May Increase Birthweight by Prolonging Gestation", *The Lancet*, pp. 367-369, (1986).

Innis, S.M., "Essential dietary lipids.", In: E.E. Ziegler and L. J. Filer (Ed), *Present Knowledge in Nutrition*, 71 Ed. ELSI Press, pp. 58-66, (1996).

Jiang, et al., "Production of conjugated linoleic acid by dairy starter cultures", *J. Appl. Micro.*, 85: 95-102, (1998).

Jumpsen, et al., "Small changes of dietary (n-6) and (n-3) fatty acid content ratio alter phosphatidyl ethanolamine and phosphatidyl choline fatty acid composition during development of neuronal and glial cells in rats", *J. Nutr.*, 127, pp. 724-731, (1997).

Kinsella, J. E., "α-Linolenic acid: Functions and effects on linoleic acid metabolism and eicosanoid-mediated reactions", *Adv. Food and Nutr. Res.* 35, pp. 1-184, (1991).

Lloyd, D. H., "Dietary supplementation and the skin", *Proc. World Sm. Animal Vet. Assn.*, pp. 74-76, (1991).

Logas, D., "Double blind crossover study with high-dose eicosapentaenoic acid supplementation for the tretment of canine allergic pruritis", *Proc. Ann. Meeting Am. Acad. Vet. Dermatol/Am. Coll. Vet. Derm.*, 9: 37, (1993).

McLean, et al., Factors determining the essential fatty acid requirements of the cat, In: Burger, I.H. and J. P. W. Rivers, (ed.), *Nutrition of the dog and cat*, Waltham Symposium No. 7, pp. 329-342, (1989).

Mercuri, et al., "Depression in microsomal desaaturation of linoleic to gamma linolenic acid in the alloxan diabetic rat", *Biochim. Biophys. Acta.*, 116, pp. 407-411, (1966).

Miller, W. H., Jr., "Fatty acid supplements as anti-inflammatory agents", *In R. W. Kirk (Ed.), Current Veterinary Therapy*, pp. 563-565, (1989).

Ogilvie, G. K., Enteral and parenteral therapy for the cancer patient, *Proc. World Sm. An. Vet. Assn.* 16th World Congress, pp. 267-270, (1991).

Osada, et al., "Dietary oxidized cholesterol modulates cholesterol metabolism and linoleic acid desaturation in rats fed highcholesterol diets", *Lipids*, 31, pp. 757-764, (1998).

Saker, et al., "Manipulation of dietary omega-3 and omega-6 fatty acids alters plalet function in cats", *Proc. Waltham International Symposium*, p. 36, (1997).

Spurlock et al., "Environment, disease impact on performance reviewed", *Feedstuffs*, 69(44), pp. 13-15, 17-19, (1997).

Toft, et al., "Effects on n-3 polyunsaturated fatty acids on glucose homeostasis and blood pressure in essential hypertension", *Ann. Intern. Med.*, 123, pp. 911-918 (1995).

Turek, et al., "Modulation of macrophage cytokine production by conjugatged linoleic acids is influenced by the dietary n-6; n-3 fatty acid ratio", *Nutri. Biochem.*, 9: 258-266, (1998).

Vilaseca et al., "Dietary fish oil reduces progression of chronic inflammatory lesions in the rat model of granulomatous colitis", *Gut*, 31: 539-544, (1990).

White, P. D., "Effects of gamma linolenic acid supplementation on serum and cutaneous fatty acid profiles and cutaneous eiosanoids in normal and atopic dogs", A double-blind, placebo controlled crossover study, *Proc. 2nd World Congr. Vet. Derm.*, 2: 32-33, (1992).

Yurawecz, et al., :A new conjugated linoleic acid isomer, 7 trans, 9 cisoctadecadlenoic acid, in cow milk, cheese, beef and human milk and adipose tissue, (1998).

Abayasekara, et al., "Effects of Altering Dietary Fatty Acid composition on Prostaglaandin Synthesis and Fertility", *Prostaglandins, Leukotrienes and Essential Fatty Acids*, vol. 61(5), pp. 275-287, (1999).

Quakenbush, et al., "The Effectiveness of Linoleic, Arachidonic, and Linolenic Acids in Reproduction and Lactation", *Jour. Of Nutrition*, vol. 2, pp. 213-224, (1942).

Database Cab, Cab International, Wallingford, Oxon, Great Britain; Database accession No. 97:77221; Walklewicz A. et al., "The influence of supplementary feeding of lactating sows with fish oil on the fat content of milk and on litter rearing outcome.".

Annales Universitatis Mariae Curie-Sklodowska, Sectio Ee Zootechnica, vol. 13, 1995, pp. 71-76.

R. Cordoba et al., "The effect of feeding salmon oil during pregnancy on causes of piglet deaths prior to weaning", Proceeds of the British Society of Animal Science, 2000, p. 105.

Database Biosis 'Online!, Biosciences Information Services, Philadelphia, PA, US; 1991, Migdal W. et al.: "Effect of Fish Oil in the Diets for Sows on Chemical Compositions of Milk and Results of Piglets Management" Database accession No. PREV199192095383 & ACTA Agraria Et Silvestria Series Zootechnia, vol. 29, 1991, pp. 47-58.

I.M. Bland et al.: "The effects of neonatal piglet behaviour and tissue composition of feeding sows a diet containing a high level of docosahexaenoic acid (DHA) in late gestation and lactation", Proceedings of the British Society of Animal Science, 1997, pp. 111.

K.L. Fritsche et al.: "Enrichment of omega-3 fatty acids in suckling pigs by maternal dietary fish oil supplementation", Journal of Animal Science, vol. 71, No. 7, 1993, pp. 1841-1847.

Deng-Qun, Shu, Jiangxi Journal of Animal Husbandry & Veterinary, vol. 2, pp. 1-13, Relations Between Fat and the Physiological Biochemistry of Livestock and Fowl (1994).

Figure 1: Frequency distribution of litter size
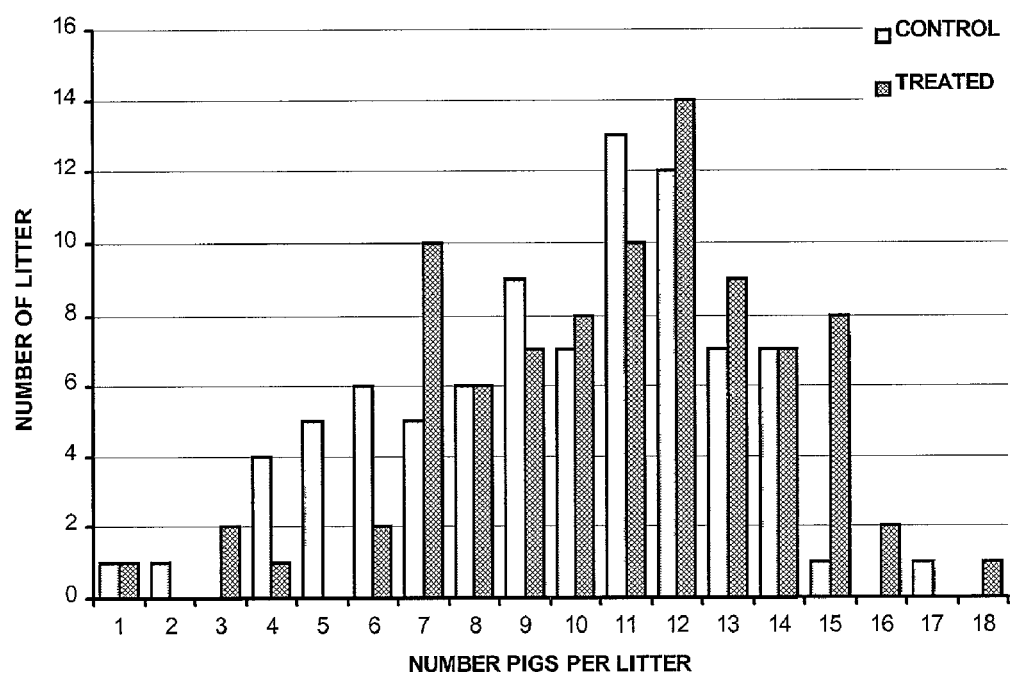

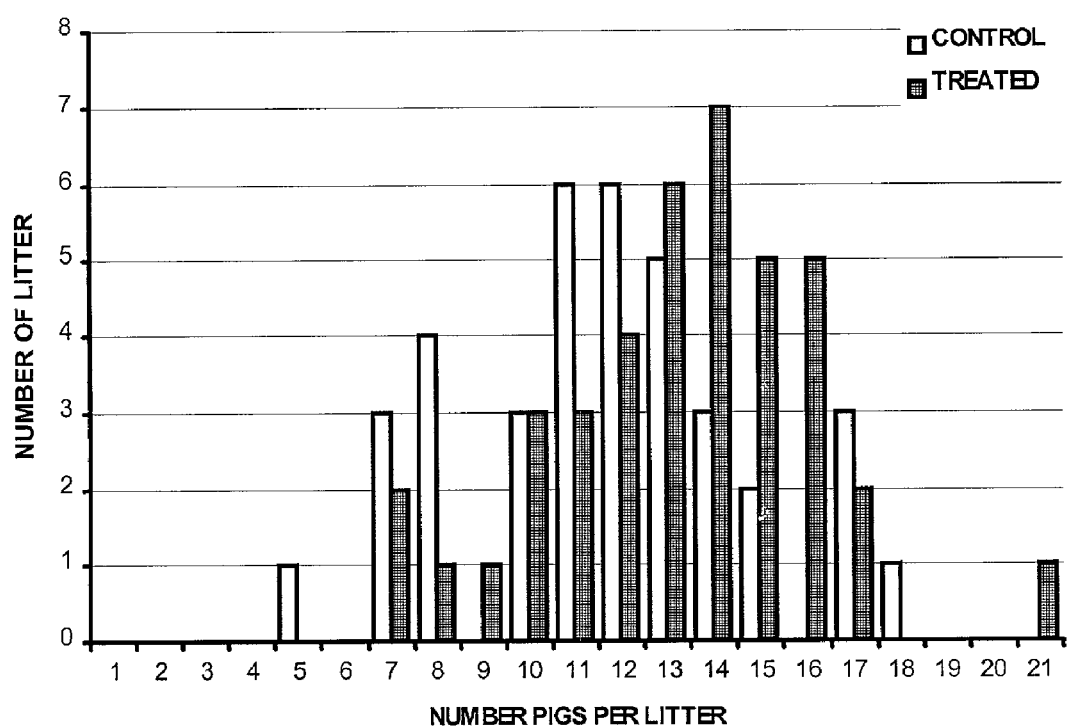
Figure 2. Frequency distribution of litter size

ANIMAL FOOD AND METHOD

CROSS REFERENCE TO RELATED APPLICATIONS

This application claims priority under 35 U.S.C. § 119(e) to U.S. Provisional Application No. 60/208,616, filed Jun. 1, 2000.

BACKGROUND OF THE INVENTION

The present invention relates to compositions and methods for improving performance of breeding populations of swine, in particular by increasing reproductive performance. These improvements enhance commercial value of swine populations. More particularly, this invention is directed to administration to both sows and boars of a feed composition containing marine animal products from which are derived long chain omega-3 fatty acids, such as eicosapentaenoic acid, docosahexaneoic acid, and docosapentaenoic acid, to increase the reproductive performance of breeding populations of swine.

Omega-3 and omega-6 fatty acids and their metabolites regulate numerous activities in vivo, including inflammation, disease resistance, platelet function and vessel wall contractions. Moreover, supplementation of omega-3 fatty acids and/or gamma-linolenic acid present in the diet of animals and humans are reported to have favorable effects on growth, heart disease, inflammatory and autoimmune disorders, diabetes, renal disease, cancer, and immunity as well as learning, visual acuity and neurological function.

On a cellular level long chain omega-3 fatty acids are readily incorporated into the phospholipid fraction of cell membranes where they influence membrane permeability/fluidity and transport. This represents a storage form of these fatty acids, where they remain until acted upon by phospholipase enzymes which release them for further conversion to eicosanoids.

Linoleic and alpha-linolenic acids are $C_{18}$-containing fatty acids that are parent compounds of the omega-6 and omega-3 families of fatty acids, respectively. Omega-3 and omega-6 fatty acids undergo unsaturation (i.e., adding double bonds) and sequential elongation from the carboxyl end (i.e., adding 2-carbon units) with the D6-desaturase enzyme being the rate limiting enzyme in metabolism of these long chain fatty acids. The same enzymes are used for these families, making the families antagonistic to one another. Such antagonism, resulting from requirements for the same enzymes, extends into the further metabolism of the $C_{20}$-containing members of these families into metabolites called eicosanoids.

The polyunsaturated fatty acids, including omega-3 and omega-6 fatty acids, differ from the other fatty acids in that they cannot be synthesized in the body from saturated or monounsaturated fatty acids, but must be obtained in the diet. The omega-6 fatty acid, linoleic acid, is found in high quantities in vegetable oils such as corn, cottonseed, soybean, safflower and sunflower oil. The omega-3 fatty acid, alpha-linolenic acid, is found in high quantities in flaxseed oil, linseed oil, perilla oil and canola oil. Other important compounds include arachidonic acid, found in animal fat; gamma-linolenic acid, found in evening primrose oil, borage oil, and blackcurrant oil; and eicosapentaenoic acid, docosahexaenoic acid, and docosapentaenoic acid derived from fish oils and marine algae. These long-chain fatty acids can be formed in the body by elongation and desaturation of the parent linoleic and alpha-linolenic acids if the parent compounds are supplied in the diet.

Various oils have been used as sources of omega-3 and omega-6 fatty acids in animal feed. The lactational responses of dairy cows fed unsaturated fat from extruded soybeans or sunflower seeds have been studied (Schingoethe, et al., 1996); flaxseed oil has been used in animal feed to increase the number of live births in sows, to increase the number of live weaned pigs, and to allow for earlier breeding (U.S. Pat. No. 5,110,592); conjugated linoleic acid has been used in animal feed to increase fat firmness, shelf life, and meat quality (U.S. Pat. No. 6,060,087); linseed oil and corn oil have been used in animal feed as a source of omega-6 fatty acids to increase the number of live births and to increase the number of weaned rats (Quackenbush, et al., 1942); salmon oil has been used in pet food to reduce damage to skin and mucosa in animals, such as dogs and cats, where the animal is afflicted with cancer and is subjected to radiation therapy (U.S. Pat. No. 6,015,798); the effects of linseed oil, and omega-3 fatty acids in particular, on increased sperm fertility and female fertility, applicable to cattle, sheep, and rats, has been studied (Abayasekara, et al., 1999); modified tall oil supplemented swine animal feed has been used to improve the carcass characteristics of swine and to increase daily weight gain (U.S. Pat. No. 6,020,377); the use of salmon oil to increase sperm fertility in roosters using a 1.5:1 ratio of omega-6 fatty acids to omega-3 fatty acids has been studied (Blesbois, et al., 1997), and the effect of dietary fatty acids on lactic acid bacteria associated with the epithelial mucosa has been studied (Ringo, et al., 1998).

SUMMARY OF THE INVENTION

Although a number of favorable effects of omega-3 and omega-6 fatty acids have been reported in animals, there has been no previous suggestion that the administration of a composition of omega-3 fatty acids or esters thereof preferably derived from marine animal products can be used to increase the reproductive performance of swine, as is described and claimed in accordance with the present invention.

The present invention is based in part on the inventors' discovery that marine animal products, including fish oils such as salmon oil, containing long chain omega-3 fatty acids, administered to a female swine in a feed composition may cause several surprising and unexpected results. A feed composition including marine animal products may result in several benefits including an increase in the number of live births to the female swine in the first parity, an increase in the number of total births to a female swine, a decrease in the interval from weaning to estrus for female swine, increases in the uniformity of birth weight of offspring of female swine, decreases in pre-weaning death loss of the offspring of female swine, and an increase in the farrowing rate for female swine. The feed compositions of the present invention containing marine animal products also decrease the percentage of morphologic sperm abnormalities in male swine, which should increase the fertility of male swine.

In an embodiment of the present invention a method is provided for increasing the reproductive performance of a female swine. The method comprises the step of administering to the female swine a biologically effective amount of a feed composition comprising marine animal products containing omega-3 fatty acids or esters thereof that serve as a source of metabolites in the female swine to improve reproductive performance of the female swine. Methods and compositions of the present invention may serve to increase the reproductive performance of a female swine by causing any of the aforementioned benefits. A "biologically effective amount" is that amount that produces the desired effect. Examples of biologically effective amounts are provided herein, but those of skill in the art can readily adjust dosages depending on the type of swine, e.g. genotype or lines, the desired effect, the time period of administration, and the like, by using the methods disclosed herein.

The marine animal product may include a fish oil, in particular a fish oil from a North Atlantic cold water fish, such as salmon oil, or may be fish meal or an oil derived from fish meal, or a mixture thereof. The marine animal product serves as a source of omega-3 and omega-6 fatty acids. In a preferred embodiment of the invention the omega-6 fatty acids/esters to omega-3 fatty acids/esters ratio in the feed composition is from about 3:1 to about 20:1.

In another embodiment of the present invention, a method is provided for decreasing the percentage of morphological abnormalities in sperm, which should increase the fertility of a male swine. The method comprises the step of administering to the male swine a biologically effective amount of a feed composition that includes oils containing omega-3 fatty acids or esters thereof that serve as a source of metabolites in the male swine to increase fertility of the male swine. The oil specified in this method may be a marine animal product, for example, a fish oil such as salmon oil, or any other oil that provides a source of omega-3 and omega-6 fatty acids. The oil may also be added to the feed composition in the form of fish meal, an oil derived from fish meal, a plant oil, or an oil derived from ground seed, or a mixture thereof. In a preferred embodiment of the invention the omega-6 fatty acids/esters to omega-3 fatty acids/esters ratio in the feed composition is from about 3:1 to about 20:1.

In yet another embodiment of this invention, a method is provided for increasing the reproductive performance of a breeding population of swine by administering the feed composition of the present invention to both sows (females) and boars (males). The method includes the steps of administering to a female swine a biologically effective amount of a feed composition that includes marine animal products containing omega-3 fatty acids or esters thereof that serve as a source of metabolites in the female swine to improve reproductive performance of the female swine and administering to a male swine a biologically effective amount of a feed composition including oils containing omega-3 fatty acids or esters thereof that serve as a source of metabolites in the male swine to decrease the percentage of morphological abnormalities in sperm, and decrease the number of rejected ejaculates which results in increased fertility of the male swine.

In another embodiment of the invention a swine feed composition is provided. The composition includes an animal feed blend and marine animal products wherein the marine animal products include a fish oil, such as salmon oil, a fish oil derived from fish meal, or fish meal products, or a mixture thereof, as a source of omega-6 and omega-3 fatty acids and their esters. Alternatively, the swine feed composition may include a plant oil, other than flaxseed oil, or a plant oil derived from ground seed. An example of a biologically effective feed composition is a composition containing about 0.025% to about 2% by weight of salmon oil, and the ratio of omega-6 fatty acids/esters to omega-3 fatty acids/esters in the feed composition is from about 3:1 to about 20:1. Another example of a biologically effective feed composition is a composition containing about 0.025% to about 1% by weight of salmon oil, and the ratio of omega-6 fatty acids/esters to omega-3 fatty acids/esters in the feed composition is from about 3:1 to about 20:1.

In an alternate embodiment of the present invention, a swine feed composition comprising an animal feed blend and marine animal products from which are derived omega-3 fatty acids selected from the group consisting of eicosapentaenoic acid, docosahexaneoic acid, and docosapentaenoic acid or a mixture thereof is provided.

In another embodiment of the present invention, a method is provided for increasing the reproductive performance of a female swine. The method comprises the step of administering to the female swine a biologically effective amount of a feed composition comprising marine animal products from which are derived omega-3 fatty acids selected from the group consisting of eicosapentaenoic acid, docosahexaneoic acid, and docosapentaenoic acid or a mixture thereof wherein the composition is administered for a time sufficient to increase the reproductive performance of the female swine. The method may serve to increase the reproductive performance of female swine by any of the benefits to the female swine described above. Examples of a "time sufficient" are disclosed herein and also may be readily determined by those of skill in the art using the methods disclosed herein.

In another embodiment of the present invention a method is provided for decreasing the percentage of morphologically abnormal sperm, and decreasing the percentage of rejected ejaculates which results in increased fertility of male swine. The method comprises the step of administering to the male swine a biologically effective amount of a feed composition including an oil from which are derived omega-3 fatty acids. Suitable omega-3 fatty acids include eicosapentaenoic acid, docosahexaneoic acid, and docosapentaenoic acid or a mixture thereof wherein the composition is administered for a time sufficient to increase the fertility of the male swine.

In yet another embodiment of the present invention, a method is provided for increasing the reproductive performance of a breeding population of swine. The method comprises the steps of administering to a female swine a biologically effective amount of a feed composition comprising marine animal products from which are derived omega-3 fatty acids selected from the group consisting of eicosapentaenoic acid, docosahexaneoic acid, and docosapentaenoic acid or a combination thereof wherein the composition is administered for a time sufficient to increase the reproductive performance of the female swine and administering to a male swine a biologically effective amount of a feed composition including a biologically effective amount of an oil from which are derived omega-3 fatty acids. Suitable fatty acids include eicosapentaenoic acid, docosahexaneoic acid, and docosapentaenoic acid or a mixture thereof wherein the composition is administered for a time sufficient to increase the fertility of the male swine.

To determine effects of the compositions of the present invention on swine reproductive performance, swine with similar genetic backgrounds are preferred. Optimal formulations may need some adjustments based on the genetic background of swine to be treated. Adjustments are preformed without undue experimentation by those of skill in the art.

BRIEF DESCRIPTION OF THE DRAWINGS

FIG. 1. Frequency distribution of litter size for control and salmon oil-treated female swine (data set 1).

FIG. 2 Frequency distribution of litter size for control and salmon oil-treated female swine (date set 2).

DETAILED DESCRIPTION OF THE INVENTION

Methods and compositions are provided for improving the performance of a swine breeding population by increasing the reproductive performance of female and male swine. The compositions of the present invention are lipid-containing compositions, and contain, in particular, marine animal products such as fish oil, fish meal, or an oil derived from fish meal, or combinations thereof. The oils from marine animals, wherein "animals" include fish, serve as a source of omega-3 fatty acids/esters and omega-6 fatty acids/esters and their metabolites, such as eicosapentaenoic acid, docosahexaneoic acid, and docosapentaenoic acid or mixtures thereof. The compositions include omega-6 and omega-3 fatty acids or esters thereof present in the composition in a ratio of from about 3:1 to about 20:1. Oils are understood to be lipids or fats including the glyceride esters of fatty acids along with associated phosphatides, sterols, alcohols, hydrocarbons, ketones, alkyl esters, salts, and related compounds.

Fatty acids with no double bonds are termed saturated fatty acids, those with one double bond are termed monounsaturated fatty acids, and those with multiple double bonds are termed polyunsaturated fatty acids. Overall digestibility appears to increase with the degree of unsaturation.

A convenient shorthand system is used in this specification to denote the structure of fatty acids. This system uses a number denoting the number of carbons in the hydrocarbon chain, followed by a colon and a number indicating the number of double bonds in the molecule, and then by a "w6" or a "w3" to denote "omega-6" or "omega-3," respectively (e.g., 22:5w6). The "w6" or a "w3" denotes the location of the first double bond from the methyl end of the fatty acid molecule. Trivial names in the w6 series of fatty acids include linoleic acid (18:2w6), gamma-linoleic acid (18:3w6), and arachidonic acid (20:4w6). The only fatty acid in the w3 series with a trivial name is alpha-linolenic acid (18:3w3). For the purposes of this application a fatty acid with the nomenclature 20:5w3 is eicosapentaenoic acid, with the nomenclature 22:6w3 is docosahexaneoic acid, and with the nomenclature 22:5w3 is docosapentaenoic acid.

The methods of the present invention utilize a lipid-containing composition as a source of long chain omega-3 fatty acids, such as eicosapentaenoic acid, docosahexaneoic acid, docosapentaenoic acid, and esters thereof, to increase the reproductive performance of female and male swine. The reproductive performance of female animals may be increased by 1) increasing the number of live births to the female animal, 2) increasing the total births (i.e., live and dead offspring) to the female animal, 3) decreasing the interval from weaning to estrus (i.e., estrus is the period during which the female animal is capable of conceiving) for a female swine, 4) increasing the uniformity of birth weight of offspring of a female swine, 5) decreasing pre-weaning death loss of the offspring of a female swine, and 6) increasing the farrowing rate (i.e., the percentage of animals that give birth) for female swine.

The number of live births to a female animal may be increased by such mechanisms as enhancing follicular development, increasing the number of oocytes available for fertilization by sperm, increasing the viability of oocytes, increasing the susceptibility of oocytes to fertilization, increasing the viability of fertilized eggs, and reducing the mortality of embryos. These effects may result from changes in oocyte membrane integrity or lipid composition such that oocyte development, fertilization, or cell function (e.g., oocyte cell membrane transport, transmembrane signaling, or the regulation of intracellular signaling pathways in the oocyte) is altered to increase reproductive performance. An increase in long chain omega-3 fatty acids present in the tissues of the offspring at birth or obtained in the diet from the mother's milk may lead to an increase in the uniformity of birth weight of offspring of a female swine and/or a decrease in pre-weaning death loss of the offspring. A decrease in the interval from weaning to estrus for a female swine might result from changes in cellular metabolism due to the presence of long chain omega-3 fatty acids in the female animal's diet.

The reproductive performance of male animals may be increased by increasing the fertility of the spermatozoa of male animals. For example, the fertility of sperm may be increased by increasing the viability or motility of the sperm, by decreasing the percentage of abnormalities in the sperm (e.g., morphological abnormalities, abnormalities in staining intensity, and motility defects), or by increasing the numbers or the potency of sperm in male animals to which the lipid-containing composition is fed or otherwise administered. These effects may result from changes in sperm membrane integrity or lipid composition or in sperm cell function or development such that the performance of sperm to bind to and to fertilize an oocyte is increased.

A biologically effective amount of the lipid-containing composition must be administered to increase the reproductive performance of the animals. By "biologically effective amount" is meant an amount of the lipid-containing composition capable of increasing the reproductive performance of female or male animals by any mechanism, including those described herein.

The compositions of the present invention that contain marine animal products are preferably administered to swine orally in a feed composition, but any other effective method of administration known to those skilled in the art may be utilized. The feed composition may contain a marine animal product, such as a fish oil (e.g., salmon oil or another fish oil from a North Atlantic cold water fish), fish meal, or an oil derived from fish meal, or a mixture thereof, to provide a source of omega-3 fatty acids/esters and omega-6 fatty acids/esters in a mixture with an art-recognized animal feed blend.

The swine feed composition may be administered to the animals for any time period that is effective to increase the reproductive performance of swine. For example, the swine feed composition may be fed to the animals daily for the lifetime of a female or male animal. Alternatively, the swine feed composition may be administered to the female or male animal for a shorter time period. In a preferred embodiment of the invention, the swine feed is administered to a pregnant female animal for a period beginning about 1 to about 4 days prior to parturition (i.e., birth) and continuing through lactation (i.e., secretion of milk by the female animal) and through the next breeding until the female animal is impregnated a second time. In another preferred embodiment of the invention, the feed composition is administered to the female swine beginning about 30 days before a first mating of the female swine during an estrus and continuing through a second mating of the female swine during the same estrus. In another preferred embodiment the feed composition is administered to the female swine beginning about 30 days before mating. In an alternate but equally preferred embodiment of the invention, the swine feed composition is administered to the female animal during lactation. The time periods for administration of the feed composition described above are nonlimiting examples and it should be appreciated that any time period determined to be effective to increase the reproductive performance of swine may be used.

Any animal feed blend known in the art may be used in accordance with the present invention such as rapeseed meal, cottonseed meal, soybean meal, and cornmeal, but soybean meal and cornmeal are particularly preferred. The animal feed blend is supplemented with a marine animal product as a source of omega-3 fatty acids/esters and omega-6 fatty acids/esters, but other ingredients may optionally be added to the animal feed blend. Optional ingredients of the animal feed blend include sugars and complex carbohydrates such as both water-soluble and water-insoluble monosaccharides, disaccharides and polysaccharides. Optional amino acid ingredients that may be added to the feed blend are arginine, histidine, isoleucine, leucine, lysine, methionine, phenylalanine, threonine, tryptophan, valine, tyrosine ethyl HCl, alanine, aspartic acid, sodium glutamate, glycine, proline, serine, cysteine ethyl HCl, and analogs, and salts thereof. Vitamins that may be optionally added are thiamine HCl, riboflavin, pyridoxine HCl, niacin, niacinamide, inositol, choline chloride, calcium pantothenate, biotin, folic acid, ascorbic acid, and vitamins A, B, K, D, E, and the like. Protein ingredients may also be added and include protein obtained from meat meal or fish meal, liquid or powdered egg, fish solubles, and the like. Any medicament ingredients known in the art may also be added to the animal feed blend such as antibiotics.

Antioxidants may be added to the feed composition to prevent oxidation of the fatty acids present in the marine animal products (e.g., fish oils) used to supplement the feed composition, such as the omega-3 long chain fatty acids, eicosapentaenoic acid, docosahexaneoic acid, and docosapentaenoic acid. Oxidation of fatty acids occurs over time and may be affected by such conditions as moisture and the presence of mineral catalysts and by such characteristics of fatty acids as the number of double bonds and positioning and configuration of bonds. Oxidation of these omega-3 fatty acids can be prevented by the introduction of naturally-occurring antioxidants, such as beta-carotene, vitamin E, vitamin C, and tocopherol or of synthetic antioxidants such as butylated hydroxytoluene, butylated hydroxyanisole, tertiary-butylhydroquinone, propyl gallate or ethoxyquin to the feed composition. Compounds which act synergistically with antioxidants can also be added such as ascorbic acid, citric acid, and phosphoric acid. The amount of antioxidants incorporated in this manner depends on requirements such as product formulation, shipping conditions (e.g., shipping under a nitrogen blanket), packaging methods, and desired shelf life.

The animal feed blend is supplemented with marine animal products such as fish oils, fish meal, fish oils derived from fish meal, other fish meal products, and the like, or a combination thereof. The fish oils may be obtained from any source, but a particularly preferred source is North Atlantic cold water fish. Fish oils obtained from North Atlantic cold water fish for use in accordance with the present invention include salmon oil, menhaden oil, mackerel oil, herring oil, and the like, but fish oils from sources other than North Atlantic cold water fish may also be used in accordance with the present invention. Fish oils provide a source of both omega-3 and omega-6 fatty acids, but are a particularly good source of omega-3 polyunsaturated fatty acids. The omega-3 polyunsaturated long chain fatty acids eicosapentaenoic acid (20:5w3), docosahexaneoic acid (22:6w3), and docosapentaenoic acid (22:5w3) are typical of fish oil and together comprise about 25–38% by weight of the fish oil. Omega-6 polyunsaturated fatty acids present in fish oil include linoleic acid and arachidonic acid and are present at lesser concentrations of about 10% by weight. The oils or fatty acid ester components may be added in an unprocessed form or in pure form, may be natural products or may be synthetic, and may be conjugated or unconjugated. The fatty acid esters added to the feed composition are preferably in the form of triglycerides, diglycerides, monoglycerides, phospholipids, lysopholipids, or are from natural sources and are chemically beneficiated for enhanced content of desired fatty acid esters.

The omega-6 fatty acids usable in the present invention are preferably unsaturated fatty acids having at least two carbon-carbon double bonds such as 2,4-decadienoic acid, linolenic acid, gamma-linolenic acid, 8, 10, 12-octadecatrienoic acid and arachidonic acid. Gamma-linolenic acid is particularly preferred. The omega-6 fatty acids/esters to omega-3 fatty acids/esters ratio in the feed composition is from about 3:1 to about 20:1. It is to be understood that the ratio of omega-6 fatty acids/esters to omega-3 fatty acids/esters in the feed composition refers to the ratio in the final feed composition (i.e., the feed composition as a final mixture) containing the animal feed blend, the marine animal product (e.g., a fish oil), and any other oils or optionally added ingredients.

Omega-6 fatty acids/esters are present in fish oils at lower concentrations than omega-3 fatty acids/esters, and, thus, to achieve the ratios of omega-6 fatty acids/esters to omega-3 fatty acids esters of from about 3:1 to about 20:1 for use in the present invention, an additional source of omega-6 fatty acids/esters is generally used in the feed composition. Additional sources of omega-6 fatty acids/esters for use in the feed composition of the present invention include omega-6 fatty acids/esters derived from an art-recognized meal such as corn meal or soybean meal or from oils such as corn oil, cottonseed oil, soybean oil, safflower oil, sunflower oil, linseed oil, borage oil, blackcurrant oil, evening primrose oil, and the like.

The omega-3 fatty acids/esters and omega-6 fatty acids/esters may be administered to the female and male swine in the form of a marine animal product, such as fish meal, or preferably an oil, such as the fish oils and oils derived from fish meal described herein or mixtures thereof, wherein the oil is used as a supplement to an art-recognized animal feed blend. The oil predominantly contains esters of omega-3 and omega-6 fatty acids which are understood to be the glyceride ester precursors of the long chain omega-3 and omega-6 fatty acid metabolites, such as eicosapentaenoic acid, docosahexaneoic acid, and docosapentaenoic acid, which are believed to be the active form of the lipid molecule in accordance with the present invention. However, the oil may also contain small amounts of free omega-3 and omega-6 fatty acids such as $C_{10}$- to $C_{18}$-containing free fatty acids. The glyceride ester precursors are broken down intracellularly in the animal after adsorption through the gastrointestinal tract to form the free omega-3 and omega-6 fatty acids. The glyceride ester precursors present in the oils used in accordance with the present invention may also be glyceride ester precursors of $C_{10}$- to $C_{18}$-containing fatty acids that undergo unsaturation and sequential elongation to form $C_{20}$- to $C_{22}$-containing long chain fatty acids, such as eicosapentaenoic acid (20:5w3), docosahexaneoic acid (22:6w3), and docosapentaenoic acid (22:5w3).

The feed composition of the present invention is supplemented with concentrations of a marine animal product, such as fish oil, fish meal, or an oil derived from fish meal, or combinations thereof, sufficient to provide amounts of omega-3 fatty acids/esters that are effective in increasing the reproductive performance of breeding populations of swine. For example, in a preferred embodiment of the invention the feed composition is supplemented with a fish oil containing omega-3 fatty acids/esters, such as salmon oil, in an amount of about 0.025% to about 1% by weight of the feed composition. In another preferred embodiment the feed composition is supplemented with a fish oil containing omega-3 fatty acids/esters, such as salmon oil, in an amount of about 0.025% to about 2%. In yet another preferred embodiment the feed composition is supplemented with a fish oil, such as salmon oil, in an amount of about 0.1% to about 0.5% by weight of the feed composition. In another preferred embodiment the feed composition is supplemented with a fish oil in an amount of about 0.2% to about 0.4% by weight of the feed composition. In each of these embodiments of the invention it is to be understood that the percentage of the fish oil by weight of the feed composition refers to the final feed composition (i.e., the feed composition as a final mixture) containing the animal feed blend, the marine animal product (i.e., the fish oil), and any other oils, and optionally added ingredients. In such embodiments of the invention, the fish oil may be derived from any type of fish or from fish meal.

In another embodiment of the invention, the feed composition is supplemented with a marine animal product such as fish meal. In one preferred embodiment the feed composition is supplemented with fish meal in an amount of about 1% to about 10% by weight of the feed composition. In another preferred embodiment, the feed composition is supplemented with fish meal in an amount of about 3% to about 4% by weight of the feed composition. It is to be understood that the percentage of fish meal by weight refers to the final feed composition containing the animal feed blend, the marine animal product, and any other oils, and optionally added ingredients.

The feed composition of the present invention can be administered to male swine or to female swine or to both male and female swine in a breeding population of swine to increase the reproductive performance of the animals. The feed composition administered to female swine is supplemented with marine animal products, such as a fish oil, fish meal, or a fish oil derived from fish meal, or a mixture thereof, in an amount sufficient to increase the reproductive performance of the female animals. The feed composition administered to male swine is preferably supplemented with a marine animal product, most preferably an oil, such as a fish oil, but fish meal, or an oil derived from fish meal, or combinations thereof, may also be used. For example, fish oils obtained from North Atlantic cold water fish including salmon oil, menhaden oil, mackerel oil, herring oil, and the like, may be used but the feed composition administered to the male swine may, alternatively, be supplemented with any other oil or source of omega-3 fatty acids/esters that is effective in increasing fertility of the male swine, including oils from any type of fish or plant oils. Exemplary of other oils for use in supplementing the feed composition administered to the male swine as a source of omega-3 fatty acids/esters are linseed oil, perilla oil, canola oil, soybean oil, and the like. In another embodiment of the invention, the feed composition administered to the male swine is supplemented with an oil in the form of ground raw seed.

The marine animal products, such as fish oil (e.g., salmon oil), may be administered in an unencapsulated or an encapsulated form in a mixture with an animal feed blend. Encapsulation protects the omega-3 fatty acids/esters and omega-6 fatty acids/esters from breakdown and/or oxidation prior to digestion and absorption of the fatty acids/esters by the animal (i.e., encapsulation increases the stability of fatty acids) and provides a dry product for easier mixing with an animal feed blend. The omega-3 fatty acids/esters and omega-6 fatty acids/esters can be protected in this manner, for example, by coating the oil with a protein or any other substances known in the art to be effective encapsulating agents such as polymers, waxes, fats, and hydrogenated vegetable oils. For example, an oil may be encapsulated using an art-recognized technique such as a $Na^{2+}$-alginate encapsulation technique wherein the oil is coated with $Na^{2+}$-alginate followed by conversion to $Ca^{2+}$-alginate in the presence of $Ca^{2+}$ ions for encapsulation. Alternatively, the oil may be encapsulated by an art-recognized technique such as prilling (i.e., atomizing a molten liquid and cooling the droplets to form a bead). For example, the oil may be prilled in hydrogenated cottonseed flakes or hydrogenated soy bean oil to produce a dry oil. The oil may be used in an entirely unencapsulated form, an entirely encapsulated form, or mixtures of unencapsulated and encapsulated oil may be added to the feed composition. Oils other than fish oils may be similarly treated.

EXAMPLE 1: Salmon Oil Typical Analysis

| Free Fatty Acids (as Oleic) | 3.0% Maximum | Moisture & Impurities | 1.0% Maximum |
|---|---|---|---|
| | Typical Fatty Acid Composition | | |
| C10 | — | C18:4 (w3) | 1.63 |
| C12 | <0.10 | C20 | 0.16 |
| C13 | <0.10 | C20:1 | 5.25 |
| C14 | 5.6 | C20:2 (w6) | 0.28 |
| C14:1 | 0.13 | C20:3 (w6) | 0.28 |
| C15 | 0.37 | C20:4 (w3/w6) | 2.32 |
| C15:1 | <0.10 | C20:5 (w3) | 10.50 |
| C16 | 13.2 | C21:5 (w3) | 0.69 |
| C16:1 | 9.0 | C22 | <0.1 |
| C16:2 | 1.15 | C22:1 | 5.18 |
| C16:3 | 0.80 | C22:4 (w6) | 0.20 |
| C16:4 | 0.67 | C22:5 (w3) | 4.94 |
| C17 | 0.33 | C22:6 (w3) | 11.0 |
| C18 | 2.81 | C24 | <0.1 |
| C18:1 | 17.3 | C24:1 | 0.49 |
| C18:2 (w6) | 3.9 | | |
| C18:3 (w3) | 1.8 | | |

Total Omega 3 Fatty Acids 31.76
Total Omega 6 Fatty Acids 5.66
Omega 3: Omega 6 ratio 5.61

EXAMPLE 2

Effect of Feed Composition Containing Fish Oil on Reproductive Performance of Female Swine Data Set 1:

Lactation Diet

Control and treated sows were fed the diets shown below during lactation. During breeding sows were fed from the time of weaning to estrus.

| INGREDIENT | CONTROL | TREATED |
|---|---|---|
| Corn | 1139 | 1139 |
| 44 SBM* (Soy bean meal) | 620 | 620 |

-continued

| INGREDIENT | CONTROL | TREATED |
|---|---|---|
| Salmon Oil | 0 | 5 |
| Soy Hulls | 50 | 50 |
| Lact. Base 120 | 120 | 120 |
| Fat | 50 | 45 |
| Premix with Antibiotics | 21 | 21 |
| 2000 lbs. | | 2000lbs. |

During estrus, sows were fed the following diet either to the first or second mating, if a second mating was necessary.

BREEDING DIET

| INGREDIENTS | TREATED |
|---|---|
| Corn | 1369 |
| 44 SBM* | 450 |
| Salmon Oil | 5 |
| Soy Hulls | 50 |
| Bache X (breeding base) | 92 |
| Fat | 30 |
| Premix with Antibiotics | 4 |
| 2000 lbs. | |

*44% crude protein

RESULTS

| TREATMENT | # OF SOWS | TOTAL BORN | BORN ALIVE | WEAN TO ESTRUS (DAYS) |
|---|---|---|---|---|
| CONTROL | 196 | 10.85 | 9.91 | 5.69 |
| TREATED | 181 | 11.27 | 10.42 | 5.69 |

DATA SET 2: LACTATION DIET

| INGREDIENT | CONTROL | TREATED |
|---|---|---|
| Corn | 1292.5 | 1287.5 |
| 44* SBM | 565 | 565 |
| Fat | 20 | 20 |
| Salmon oil | — | 5 |
| Lact. Base 120 | 120 | 120 |
| Premix with Antibiotics | 2.5 | 2.5 |
| 2000 lbs. | 2000 lbs | |

*44% crude protein
Sows were fed during lactation.

RESULTS

| TREATMENT | # OF SOWS | TOTAL BORN | BORN ALIVE | WEAN TO ESTRUS (DAYS) |
|---|---|---|---|---|
| CONTROL | 126 | 11.50 | 10.39 | 5.98 |
| TREATED | 155 | 12.01 | 10.31 | 5.66 |

EXAMPLE 3

Effect of Feed Composition Containing Fish Oil on Boars' Reproductive System

In preliminary studies, boar ration #1 was used. As a preliminary result, there was a 25–30% increase in the number of doses of semen produced by a treated boar. Most of this response was due to less of the boar's ejaculates being rejected from further processing, thus increasing the number of doses of semen produced. This had a significant increase in financial gains from this stud.

Another large test on the effects of the feed composition of the present invention on the reproductive system of boars was performed with approximately 220 boars. The boars were first fed the control ration (ration #3) and ejaculates were examined for each boar. The boars were then fed boar ration #2 containing salmon oil and ejaculates were examined for each boar. The boars were fed the same diet during the "treatment" period as during the control period except for the addition of salmon oil at 5 lbs./ton of final diet. The effect of feeding boar ration #2 was that the number of rejected ejaculates was 50% less when the boars were fed boar ration #2 than when the boars were fed the control diet (ration #3). There were 86 rejected ejaculates when the boars were fed the control ration and 41 rejected ejaculates when the boars were fed ration #2. This is a significant savings and improved efficiency of producing doses of semen.

| FEED | NO. OF BOARS | # OF REJECTED EJACULATES |
|---|---|---|
| Control | 220 | 86 |
| Treatment | 220 | 41 |

TREATMENT RATIONS

BOAR RATION #1

| Corn | 1371.5 |
|---|---|
| Soybean Meal | 300.0 |
| Fish Meal | 60.0 |
| Boar Base | 268.5 |
| | 2000.0 lbs. |

BOAR RATION #2

| Corn | 1326.5 |
|---|---|
| Soybean Meal | 400.0 |
| Salmon Oil | 5.0 |
| Boar Base | 268.5 |
| | 2000.0 lbs. |

CONTROL RATIONS

| Corn | 1331.5 |
|---|---|
| Soybean Meal | 400 |
| Salmon Oil | 0 |
| Boar Base | 268.5 |
| | 2000 lbs. |

Boars were fed individually once daily, and were kept separate from the females.

EXAMPLE 4

Effect of Feed Composition Containing Fish Oil on the Reproductive Performance of Female Swine Data Set 1:

Female swine were randomly assigned within parity to a control or a salmon oil containing diet upon entry to the farrowing room at approximately 110 days of gestation. Control sows received the lactation ration described below and treated sows received the same ration with 5 pounds of salmon oil replacing 5 pounds of fat.

| LACTATION RATION | | |
|---|---|---|
| Ingredient | Control | Treatment |
| Corn | 1229.0 | 1229.0 |
| SBM, 48% | 566.5 | 566.5 |
| Lact. Base 120 | 120.0 | 120.0 |
| Salmon Oil | 0.0 | 5.0 |
| Fat | 20.0 | 15.0 |
| Laxative Pak | 10.0 | 10.0 |
| A-90 | 2.5 | 2.5 |
| Nutrisound | 1.0 | 1.0 |
| Mold Inhibitor | 1.0 | 1.0 |
| Soy Hulls | 50.0 | 50.0 |
| Total | 2000.0 | 2000.0 |

Female swine in the treatment group continued on the salmon oil-containing diet following weaning during the rebreeding period, with 5 pounds of salmon oil included in the breeding ration (described below).

| BREEDING RATION | | |
|---|---|---|
| Ingredient | Control | Treatment |
| Corn | 1423.0 | 1423.0 |
| SBM, 48% | 359.5 | 359.5 |
| Sow 93 | 93.0 | 93.0 |
| Salmon Oil | 0.0 | 5.0 |
| Fat | 20.0 | 15.0 |
| A-90 | 2.5 | 2.5 |
| Nutrisound | 1.0 | 1.0 |
| Mold Inhibitor | 1.0 | 1.0 |
| Soy Hulls | 100.0 | 100.0 |
| Total | 2000.0 | 2000.0 |

The salmon oil was stored in a 55-gallon metal drum. Each time feed was prepared, salmon oil was removed from the drum with a manual pump, weighed and placed in the mixer. Feed was immediately delivered to a designated storage tank adjacent to the farrowing rooms. Two feed tanks with associated auger system delivered feed to each farrowing room. Fresh feed was prepared at approximately one week intervals, and feeding of the animals with a portion of the freshly prepared feed was initiated immediately. A similar procedure was followed for the breeding diet. Female swine were fed according to standard procedures, which consisted of female swine receiving 4 to 5 pounds of feed per day prior to farrowing and then increasing the amount of feed by approximately 2 pound per day post farrowing until the female swine reached ad libitum intake. Female swine received approximately 6 pounds of feed per day during breeding.

Within 48 hours following farrowing, piglets were cross-fostered to equalize the number of piglets nursing on each sow. Piglets were fostered within and across treatments and were weaned at approximately 14 days after birth and the female swine were then moved to breeding stalls for estrus detection and mating. All female swine were housed in gestation stalls and fed a common gestation ration until subsequent entry into the farrowing room.

A total of 42 control and 45 treated sows were allotted to the trial. The total number of piglets born at the second farrowing was greater ($p<0.05$) for salmon oil treated (13.2) than control sows (11.7) as shown in the table below.

| Effect of salmon oil on sow reproductive performance | | |
|---|---|---|
|  | Control | Treated |
| Number of Sows | 42 | 45 |
| Wean to Estrus Interval | 5.6 | 5.1 |
| Number Farrowed | 37 | 40 |
| Total Pigs Born | 11.7[a] | 13.2[b] |
| Pigs Born Live | 10.8[a] | 12.35[b] |

[a,b]Means within a row without common superscripts differ significantly ($P<0.05$).

The frequency distribution for litter size is shown FIG. 1. This frequency distribution shows a shift, with fewer litters of less than twelve piglets for treated female swine compared to controls and greater numbers of larger litters for treated female swine.

Data Set 2:

The same procedures as described above were used except that a total of 109 control and 107 sows were allotted to the trial and the lactation and breeding rations described below were used.

| LACTATION RATION | | |
|---|---|---|
| Ingredient | Control | Treatment |
| Corn | 1229.0 | 1229.0 |
| SBM, 48% | 566.5 | 566.5 |
| Lact. Base 120 | 120.0 | 120.0 |
| Salmon Oil | 0.0 | 10.0 |
| Fat | 20.0 | 10.0 |
| Laxative Pak | 10.0 | 10.0 |
| A-90 | 2.5 | 2.5 |
| Nutrisound | 1.0 | 1.0 |
| Mold Inhibitor | 1.0 | 1.0 |
| Soy Hulls | 50.0 | 50.0 |
| Total | 2000.0 | 2000.0 |

| BREEDING RATION | | |
|---|---|---|
| Ingredient | Control | Treatment |
| Corn | 1423.0 | 1423.0 |
| SBM, 48% | 359.5 | 359.5 |
| Sow 93 | 93.0 | 93.0 |
| Salmon Oil | 0.0 | 10.0 |
| Fat | 20.0 | 10.0 |
| A-90 | 2.5 | 2.5 |
| Nutrisound | 1.0 | 1.0 |

-continued

BREEDING RATION

| Ingredient | Control | Treatment |
|---|---|---|
| Mold Inhibitor | 1.0 | 1.0 |
| Soy Hulls | 100.0 | 100.0 |
| Total | 2000.0 | 2000.0 |

The total number of piglets born at the second farrowing was greater (p<0.05) for salmon oil treated (11.76) than control sows (10.67) as shown below. The frequency distribution for litter size is shown in FIG. 2. This frequency distribution shows a shift, with fewer litters of less than eleven pigs for treated female swine compared to controls and a greater number of larger litters for treated female swine.

Effect of salmon oil on sow reproductive performance

|  | Control | Treated |
|---|---|---|
| Number of Sows | 109 | 107 |
| Wean to Estrus Interval | 6.28 | 6.25 |
| Number Farrowed | 85 | 88 |
| Total Pigs Born | 10.67[a] | 11.76[b] |
| Pigs Born Live | 9.81[a] | 10.76[b] |

[a,b]Means within a row without common superscripts differ significantly (P<0.05)

Example 4) without salmon oil, control feed plus prilled concentrate, control feed plus liquid salmon oil (not prilled), and a premix (a vitamin and mineral supplement) with liquid salmon oil were collected and were analyzed for omega fatty acid content over an 8-week period. Prilled concentrate, control feed, and control feed plus prilled concentrate samples were collected on the day of manufacture and were analyzed within 7 days of manufacture (designated as "Wk 0"). Products were sampled at 4-week intervals for fatty acid analysis (designated "Wk 4" and "Wk 8"). Samples of control feed plus liquid salmon oil and premix plus liquid salmon oil were collected and analyzed approximately four weeks after manufacture (designated "Wk 4"). Samples of the control feed plus liquid salmon oil and premix plus liquid salmon oil were collected and analyzed again four weeks later (designated "Wk 8"). The samples were analyzed for omega fatty acid content by using art-recognized techniques for lipid extraction ("Mojonnier Method," A.O.A.C. 954.02, 15$^{th}$ Edition, 1990) and fatty acid analysis (determined by gas chromatography-A.O.C.S. Ce1e-91 and Ce1d-91 for omega fatty acids).

The results are shown in the table below. The data for the salmon oil-containing feed and salmon oil-containing premix samples are expressed as % by weight (i.e., g/100 g). The results demonstrate that the omega fatty acids in prilled salmon oil from a mixture with animal feed are stable over time. In contrast, the omega fatty acids in liquid salmon oil in a mixture with animal feed or with premix are not detected at 4 weeks after mixture with the feed composition, likely due to oxidation of the fatty acids.

Concentration of Omega Fatty Acids in Feed Composition & Stability over Time

|  | Prilled Concentrate | Control Feed no Prilled Concentrate | Feed plus Prilled Concentrate[1] | Feed plus Liquid Salmon Oil[2] | Premix plus Liquid Salmon Oil[3] |
|---|---|---|---|---|---|
| Wk 0 | | | | | |
| C20:5 | 2.74 | <0.01 | 0.29 | Not sampled | Not sampled |
| C22:6 | 2.93 | <0.01 | 0.31 | Not sampled | Not sampled |
| Wk 4 | | | | | |
| C20:5 | 2.66 | <0.01 | 0.26 | <0.01 | 0.01 |
| C22:6 | 2.81 | <0.01 | 0.28 | <0.01 | <0.01 |
| Wk 8 | | | | | |
| C20:5 | 2.75 | <0.01 | 0.26 | 0.02 | <0.01 |
| C22:6 | 2.95 | <0.01 | 0.29 | 0.01 | <0.01 |

[1]Prilled SO inclusino rate 10.75%.
[2]Liquid SO inclusion rate 3.75%.
[3]Liquid SO inclusion rate 2.8%.

EXAMPLE 5

Effect of Prilling on Stability of Omega Fatty Acids in the Feed Composition

Salmon Oil was prilled (i.e., converted from a molten liquid and atomized into droplets to form a prill, or a bead) to produce a 35% w/w salmon oil prilled concentrate. The prilled concentrate was mixed at 10.75% w/w with animal feed. Samples (about 0.5 kg) of prilled concentrate (no feed), control feed (lactation diet composition as described in

We claim:

1. A method of increasing the reproductive performance of a female swine, comprising the step of administering to the female swine a feed composition comprising a marine animal product;

wherein the marine animal product comprises $C_{20}$ and $C_{22}$ omega-3 fatty acids or esters thereof; and wherein the feed composition as a final mixture comprises about 0.025% to about 2% by weight of the marine animal product.

2. The method of claim 1 wherein the marine animal product is selected from the group consisting of a fish oil and a fish oil derived from a fish meal product, or a mixture thereof.

3. The method of claim 1 wherein the marine animal product comprises a fish oil from a North Atlantic cold water fish.

4. The method of claim 3 wherein the fish oil comprises salmon oil.

5. The method of claim 1 wherein the feed composition further comprises omega-6 fatty acids or esters thereof.

6. The method of claim 5 wherein the omega-6 fatty acids/esters to omega-3 fatty acids/esters ratio in the feed composition as a final mixture is from about 3:1 to about 20:1.

7. The method of claim 4 wherein the feed composition as a final mixture comprises about 0.025% to about 1% by weight of salmon oil.

8. The method of claim 2 wherein the feed composition as a final mixture comprises about 0.025% to about 1% by weight of the fish oil or the fish oil derived from the fish meal product.

9. The method of claim 1 wherein the feed composition is administered daily to the female animal.

10. The method of claim 1 wherein the feed composition is administered to the female swine beginning about 30 days before a first mating of the female swine during an estrus and continuing through a second mating of the female swine during the same estrus.

11. The method of claim 1 wherein the feed composition is administered to the female swine beginning about 1 to about 4 days prior to parturition and continuing through the next breeding.

12. The method of claim 1 wherein the feed composition is administered during lactation.

13. The method of claim 1 wherein the feed composition as a final mixture further comprises an antioxidant.

14. The method of claim 1 wherein the omega fatty acids in the marine animal product are stabilized by prilling.

15. A method of increasing the number of live births to a female swine, comprising the step of administering to the female swine a feed composition comprising a marine animal product;
   wherein the marine animal product comprises $C_{20}$ and $C_{22}$ omega-3 fatty acids or esters thereof; and
   wherein the feed composition as a final mixture comprises about 0.025% to about 2% by weight of the marine animal product.

16. A method of increasing the total number of births to a female swine, comprising the step of administering to the female swine a feed composition comprising a marine animal product;
   wherein the marine animal product comprises $C_{20}$ and $C_{22}$ omega-3 fatty acids or esters thereof; and
   wherein the feed composition as a final mixture comprises about 0.025% to about 2% by weight of the marine animal product.

17. A method of increasing the uniformity of birth weight of offspring of a female swine, comprising the step of administering to the female animal a feed composition comprising a marine animal product;
   wherein the marine animal product comprises $C_{20}$ and $C_{22}$ omega-3 fatty acids or esters thereof; and
   wherein the feed composition as a final mixture comprises about 0.025% to about 2% by weight of the marine animal product.

18. A method of increasing the farrowing rate of a female swine, comprising the step of administering to the female swine a feed composition comprising a marine animal product;
   wherein the marine animal product comprises $C_{20}$ and $C_{22}$ omega-3 fatty acids or esters; and
   wherein the feed composition as a final mixture comprises about 0.025% to about 2% by weight of the marine animal product.

19. A method of increasing the reproductive performance of a breeding population of swine comprising the step of:
   administering to a female swine a feed composition comprising a marine animal product;
   wherein the marine animal product comprises $C_{20}$ and $C_{22}$ omega-3 fatty acids or esters thereof; and
   wherein the feed composition as a final mixture comprises about 0.025% to about 2% by weight of the marine animal product.

20. A method of increasing the reproductive performance of a female swine, comprising the step of administering to the female swine a feed composition comprising a marine animal product;
   wherein the marine animal product comprises $C_{20}$ omega-3 fatty acids or esters thereof; and
   wherein the feed composition as a final mixture comprises about 0.025% to about 2% by weight of the marine animal product.

21. A method of increasing the reproductive performance of a female swine, comprising the step of administering to the female swine a feed composition comprising a marine animal product;
   wherein the marine animal product comprises $C_{22}$ omega-3 fatty acids or esters thereof; and
   wherein the feed composition as a final mixture comprises about 0.025% to about 2% by weight of the marine animal product.

22. A method of increasing the reproductive performance of a female swine, comprising the step of administering to the female swine a feed composition comprising a marine animal product wherein the marine animal product is a fish meal product and wherein the fish meal product comprises $C_{20}$ and $C_{22}$ omega-3 fatty acids or esters thereof.

23. The method of claim 22 wherein the fish meal product is from a North Atlantic cold water fish.

24. The method of claim 22 wherein the feed composition further comprises omega-6 fatty acids or esters thereof.

25. The method of claim 24 wherein the omega-6 fatty acids/esters to omega-3 fatty acids/esters ratio in the feed composition as a final mixture is from about 3:1 to about 20:1.

26. The method of claim 22 wherein the feed composition as a final mixture comprises about 1% to about 10% by weight of the fish meal product.

27. The method of claim 22 wherein the feed composition is administered daily to the female animal.

28. The method of claim 22 wherein the feed composition is administered to the female swine beginning about 30 days before a first mating of the female swine during an estrus and continuing through a second mating of the female swine during the same estrus.

29. The method of claim 22 wherein the feed composition is administered to the female swine beginning about 1 to about 4 days prior to parturition and continuing through the next breeding.

30. The method of claim 22 wherein the feed composition is administered during lactation.

31. The method of claim 22 wherein the feed composition as a final mixture further comprises an antioxidant.

32. A method of increasing the reproductive performance of a female swine, comprising the step of administering to the female swine a feed composition comprising a marine animal product;
wherein the marine animal product comprises omega-6 fatty acids or esters thereof and $C_{20}$ and $_{22}$ omega-3 fatty acids or esters thereof; and
wherein the omega-6 fatty acids/esters to omega-3 fatty acids/esters ratio in the feed composition as a final mixture is from about 3:1 to about 20:1.

33. The method of claim 32 wherein the marine animal product is an oil from a North Atlantic cold water fish.

34. The method of claim 32 wherein the marine animal product comprises salmon oil.

35. The method of claim 34 wherein the feed composition as a final mixture comprises about 0.025% to about 1% by weight of salmon oil.

36. The method of claim 32 wherein the feed composition as a final mixture comprises about 0.025% to about 1% by weight of the marine animal product.

37. The method of claim 34 wherein the feed composition as a final mixture comprises about 0.025% to about 2% by weight of salmon oil.

38. The method of claim 32 wherein the feed composition as a final mixture comprises about 0.025% to about 2% by weight of the marine animal product.

39. The method of claim 32 wherein the feed composition is administered daily to the female animal.

40. The method of claim 32 wherein the feed composition is administered to the female swine beginning about 30 days before a first mating of the female swine during an estrus and continuing through a second mating of the female swine during the same estrus.

41. The method of claim 32 wherein the feed composition is administered to the female swine beginning about 1 to about 4 days prior to parturition and continuing through the next breeding.

42. The method of claim 32 wherein the feed composition is administered during lactation.

43. The method of claim 32 wherein the feed composition as a final mixture further comprises an antioxidant.

44. The method of claim 32 wherein the omega fatty acids in the marine animal product are stabilized by prilling.

45. The method of claim 1 wherein the marine animal product is menhaden oil.

46. The method of claim 45 wherein the feed composition as a final mixture comprises about 0.025% to about 1% by weight of menhaden oil.

47. The method of claim 32 wherein the marine animal product is menhaden oil.

48. The method of claim 47 wherein the feed composition as a final mixture comprises about 0.025% to about 1% by weight of menhaden oil.

49. The method of claim 47 wherein the feed composition as a final mixture comprises about 0.025% to about 2% by weight of the menhaden oil.

50. The method of claim 1 wherein the feed composition further comprises a plant oil.

51. The method of claim 1 wherein the feed composition is fed to the female swine daily for the lifetime of the female swine.

* * * * *